(12) United States Patent
Ahmed

(10) Patent No.: US 10,659,443 B2
(45) Date of Patent: May 19, 2020

(54) METHODS AND APPARATUS FOR OBTAINING A SCOPED TOKEN

(71) Applicant: Telefonaktiebolaget LM Ericsson (publ), Stockholm (SE)

(72) Inventor: Abu Shohel Ahmed, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 130 days.

(21) Appl. No.: 15/545,060

(22) PCT Filed: Jan. 23, 2015

(86) PCT No.: PCT/EP2015/051409
§ 371 (c)(1),
(2) Date: Jul. 20, 2017

(87) PCT Pub. No.: WO2016/116171
PCT Pub. Date: Jul. 28, 2016

(65) Prior Publication Data
US 2018/0007024 A1 Jan. 4, 2018

(51) Int. Cl.
*H04L 9/32* (2006.01)
*H04L 29/06* (2006.01)

(52) U.S. Cl.
CPC .......... *H04L 63/062* (2013.01); *H04L 63/083* (2013.01); *H04L 63/0807* (2013.01)

(58) Field of Classification Search
CPC .................................................. H04L 63/062
See application file for complete search history.

(56) References Cited

U.S. PATENT DOCUMENTS

| 7,660,819 B1 * | 2/2010 | Frieder ............... G06F 16/3346 707/999.107 |
| 2013/0086645 A1 | 4/2013 | Srinivasan et al. |
| 2013/0185809 A1 | 7/2013 | Yabe |
| 2015/0089596 A1 * | 3/2015 | Sondhi ................. H04L 63/08 726/4 |

FOREIGN PATENT DOCUMENTS

| EP | 2552079 A1 | 1/2013 |
| GB | 2489563 A | 10/2012 |

OTHER PUBLICATIONS

International Search Report and Written Opinion issued in International Application No. PCT/EP2015/051409, dated Jun. 1, 2015, 9 pages.

(Continued)

*Primary Examiner* — Josnel Jeudy
(74) *Attorney, Agent, or Firm* — Rothwell, Figg, Ernst & Manbeck, P.C.

(57) ABSTRACT

A method, performed by a server, for determining token scope information so that a client can obtain a scoped token for a cloud service is disclosed. The method comprises requesting and receiving data of a cloud service from another server, receiving a token scope information request for an operation of the cloud service from a client and deriving token scope information based on the data for said operation. The method further comprises sending token scope information to the client so that the client can request a scoped token with capabilities enabling them to access the operation of the cloud service.

18 Claims, 11 Drawing Sheets

(56) References Cited

OTHER PUBLICATIONS

Google: "Google Cloud Platform Authentication", dated Dec. 19, 2014, 5 pages, https://web.archive.org/web/20141228130616/https://cloud.google.com/storage/docs/authentication.

Annonymous: "Identity Service Introduction Cloud Services", dated Mar. 1, 2012, 7 pages, https://community.hpcloud.com/article/identity-service-introduction.

Jones, M. and Hardt, D., "The OAuth 2.0 Authorization Framework: Bearer Token Usage", dated Oct. 2012, 19 pages, Internet Engineering Task Force (IETF), http://www.hjp.at/dock/rfc/rfc6750.html.

"API Examples using Curl", Keystone 9.0.0.dev172 documentation, Oct. 11, 2015, 16 pages, http://docs.opensack.org/developer/keystone/api_curl_examples.html.

Fielding, Roy Thomas, Fielding Dissertation: Chapter 5: Representational State Transfer (REST), Oct. 11, 2015, 16 pages, http://www.ics.uci.edu/~fielding/pubs/dissertation/rest_arch_style.htm.

Keystone Architecture—keystone 9.0.0.dev172 documentation, Oct. 11, 2015, 4 pages, http://docs.openstack.org/developer/keystone/architecture.html.

Open Source software for creating private and public clouds, 1 page, Jul. 20, 2017, www.Openstack.org.

\* cited by examiner

METHODS AND APPARATUS FOR OBTAINING A SCOPED TOKEN

CROSS REFERENCE TO RELATED APPLICATION(S)

This application is a 35 U.S.C. § 371 National Stage of International Patent Application No. PCT/EP2015/051409, filed Jan. 23, 2015, designating the United States, the disclosure of which is incorporated by reference.

TECHNICAL FIELD

Embodiments herein relate to a method and an apparatus for obtaining a scoped token. Embodiments also relate to a computer program configured to carry out methods for obtaining a scoped token.

BACKGROUND

Cloud computing is computing in which large groups of remote servers are networked to allow scalable and on demand access to computing services or resources. This converged infrastructure enables shared services between a number of users. Cloud computing may be used to implement a variety of computational paradigms, such as virtual machines, jobs, remote procedure calls, traditional servers, etc.

Popular cloud computing architectures are stateless meaning that there is no record of previous interactions and each interaction request has to be handled based entirely on information that comes with it. For example, cloud systems EC2 or OpenStack use stateless design principle such as REST wherein client context is not stored in a server between requests.

In stateless architectures, each request contains an access credential usually in the form of a token. Thus, each request to an OpenStack service contains a token to authenticate and authorize a request.

Systems of using tokens in cloud computing as a way for a user to authenticate themselves against an application is known, for example, from US2014373126.

In stateless architecture, to obtain a token that will give a user access to a particular service, a user first authenticates themselves using an unscoped token and then requests a scoped token from a scoped token provider. If the authentication and the request for a scoped token is successful, the scoped token provider issues a scoped token to the user. The scoped token comprises capabilities which include role, permission, rules and conditions, expiry time, delegation capability, target endpoint or target resource. The scoped token enables the user to access protected resources by requesting a service or perform an operation using the scoped token, for example create a virtual machine.

For the scoped token provider to issue a scoped token to the user with the correct capabilities, the user needs to include in their request for a scoped token what capabilities are required for an operation of a service.

In many cases, it is difficult for a user to determine the exact scope required for a token, i.e. what access or credentials the user requires in order to use a service. This may result in an over-scoped token which comprises more capabilities than necessary for the service, thus the user would have access to other restricted resources. Thus, an over-scoped token is a security risk, and if misused, could result in malicious actions by users. As an example, in OpenStack a token is not bound to a particular service endpoint and as such the token is valid for several service endpoints giving a user access to more service endpoints than required.

SUMMARY

According to an aspect of the invention there is provided a method, performed by a server, for determining token scope information so that a client can obtain a scoped token for a cloud service, the method comprising; requesting and receiving data of a cloud service from another server; receiving a token scope information request for an operation of the cloud service from a client; deriving token scope information based on the data for said operation; and sending token scope information to the client so that the client can request a scoped token with capabilities enabling them to access the operation of the cloud service.

In one embodiment, the derived token scope information is limited to the operation of the cloud service.

In another embodiment, the method further comprises the server matching the operation with the data so as to derive the token scope information.

The method may further comprise the server sending a request to an orchestrator for determining if the operation comprises at least two sub-operations and if so identifying the sub-operations.

In one embodiment, the method may further comprise the server receiving a response from the orchestrator, the response comprising sub-operations of the operation.

In another embodiment, the method comprises the server receiving a response from the orchestrator, the response comprising the operation.

In one embodiment, the method further comprises the server deriving token scope information for each sub-operation.

In yet another embodiment, the method further comprises the server matching each sub-operation against the data so as to derive token scope information for each sub-operation.

The method may further comprise removing duplicate token scope information and then combining the token scope information of each sub-operation before sending the token scope information to the client.

In one embodiment, the data comprises policy administration files and policy information.

In a further embodiment, the data comprises scope parameters that are hierarchically defined such that the server identifies in the policy information a client's preference for particular scope token information.

In yet another embodiment, the method further comprises the server sending the token scope information to the client as a uniform resource identifier, URI.

The method may further comprise the server receiving a request comprising said URI from a cloud service and the server sending the token scope information corresponding to the URI to the cloud service.

In one embodiment, the client is a user or an orchestrator operating on behalf of the user.

In another embodiment, the another server is a designated centralized policy server such that the data from different cloud services is located centrally and/or said another server is a cloud service server such that the data of each cloud service is located in respective cloud service server.

In yet another embodiment, the token scope information specifies capabilities required for a token so to provide a client to perform an operation on a cloud service.

According to another aspect of the invention, there is provided a server, for determining token scope information so that a client can obtain a scoped token for a cloud service, the server comprising; a data collection module for collecting data of a cloud service from another server; a derivation module for deriving token scope information based on the data for an operation of the cloud service, a delivery module for sending token scope information to the client so that the client can request a scoped token with capabilities enabling them to access the operation of the cloud service.

In one embodiment, the derivation module is further for matching the operation with the data so as to derive the token scope information.

In another embodiment, the operation comprises sub-operations, the derivation module is further for matching each sub-operation against the data so as to derive token scope information for each sub-operation.

In yet another embodiment, the server further comprises a filter and combination module for removing duplicate token scope information and then combining the token scope information of each sub-operation before sending the token scope information to the client. The data may comprise policy administration files and policy information.

The data may comprise scope parameters that are hierarchically defined such that the derivation module is further for identifying in the policy information a client's preference for particular scope token information.

In one embodiment, the delivery module is further for sending the token scope information to the client as a uniform resource identifier, URI, and upon receiving a request comprising said URI from a cloud service, the server sends the token scope information corresponding to the URI to the cloud service.

According to another aspect of the invention, there is provided, a server configured to determine token scope information so that a client can obtain a scoped token for a cloud service, the server comprising a processor and a memory, the memory containing instructions executable by the processor, such that the server is operable to request and receive data of a cloud service from another server; receive a token scope information request for an operation of a cloud service from a client; derive token scope information based on the data for said operation, send token scope information to the client so that the client can request a scoped token with capabilities enabling them to access the operation of the cloud service.

According to yet another aspect of the invention, there is provided a computer program configured, when run on a computer, to carry out a method according to any one of claims 1 to 16 appended hereto.

According to a further aspect of the invention, there is provided a computer program product comprising computer readable medium and a computer program as mentioned above stored on the computer readable medium.

According to yet another aspect of the invention, there is provide a method, performed by a client, for obtaining token scope information so to request a token for a cloud service, the method comprising; requesting token scope information for an operation of a cloud service from a server; receiving said token scope information from the server; and sending the token scope information to another server and requesting a scoped token based on the scope information from said another server.

In one embodiment, the method further comprises the client receiving token scope information comprising at least two sets of token scope information for the same operation, and the client determining which set of token scope information to send to said another server.

BRIEF DESCRIPTION OF THE DRAWINGS

Embodiments will now be described by way of example only in relation to the enclosed drawings, in which.

DETAILED DESCRIPTION

Aspects of the present invention provide a method for determining token scope information so that a client can obtain a scoped token for a cloud service, wherein the scoped token does not have too many capabilities for the intended operation, thus not posing as a security risk, but also where the scoped token has sufficient capabilities for the desired or intended operation of the cloud service.

Figure 1:
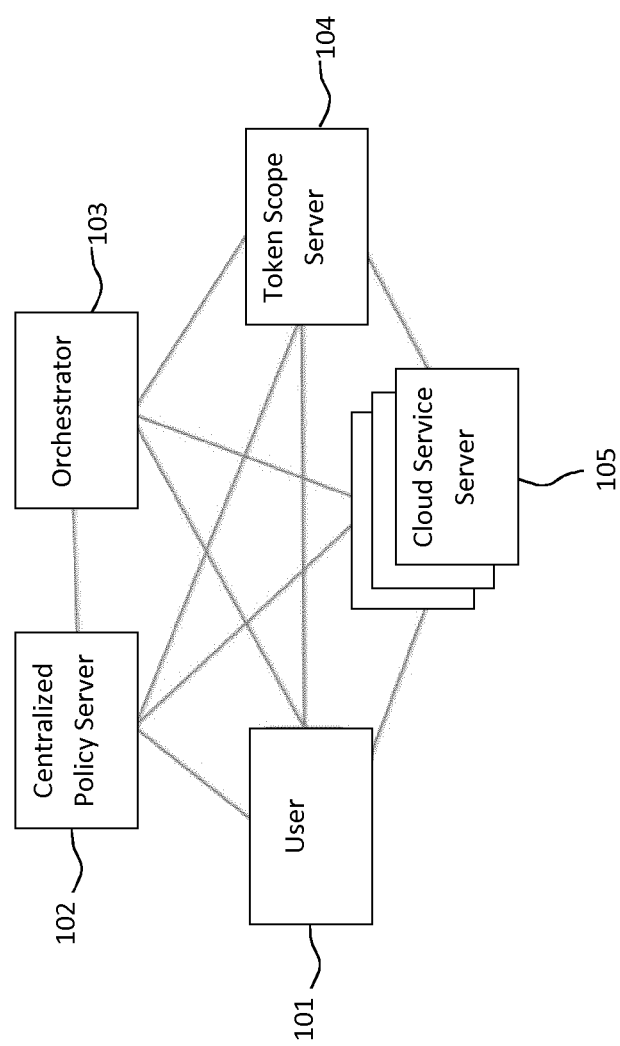
FIG. 1 shows a schematic illustration of communication between units.

Referring now to FIG. 1, an embodiment of unit is shown, the schematic illustration is shown of a user 101, a token scope server 104, a cloud service server 105, a centralized policy server (also acts as an authentication server) 102 and an orchestrator 103. The different units communicate with one another, as indicated by the lines connecting the different units, and they do so in order to authenticate the user 101 against the cloud service and to authorise the user 101 to use said cloud service 105.

FIG. 1 represents several embodiments that will now be described in more detail with reference to the other figures.

It should be understood that the term "user" used herein includes an application, such as a cloud computing application, a computer program, a person, or a device. Examples of a device include a computer, laptop, tablet, smart phone, mobile communication device or constrained devices.

It should also be understood that the term "end point service" used herein includes a cloud service run on at least one cloud service server.

It should also be realised that the centralized policy server described herein stores data such as policy data and user attributes data. The policy data is described herein as policy administration files including rules on who can perform what action on a cloud service under certain conditions. The user attributes data is described herein as policy information comprising user related attributes including user domain, user tenant, user roles, allowed endpoints. The centralized policy server described herein also acts as an authentication server in that it authenticates users requesting an unscoped token as will become clear from the description below.

A method will now be described with reference to FIG. 2, enabling a client 201 to authenticate itself against a cloud service server 204 and also be authorised such that the cloud service server will perform a requested operation.

The method comprises the client, which in this embodiment is a user 201, performing authentication with a centralized policy server 202, thus the centralized policy server acts as an authentication server, and requesting an unscoped token from said centralized policy server 202. The centralized policy server sends in response an unscoped token to the user 201. These steps are represented by step 220.

The token scope server 203 requests from either the centralized policy server 202 and/or the cloud service server 204 data of a cloud service, step 221a, 221b. In one embodiment, the token scope server 203 requests data of several cloud services and stores the data in a memory. The data comprises policy administration files and policy information. The policy administration files comprise rules on who can perform what action on a cloud service under certain conditions. The policy information comprises user related attributes including user domain, user tenant, user roles, allowed endpoints.

Figure 2:
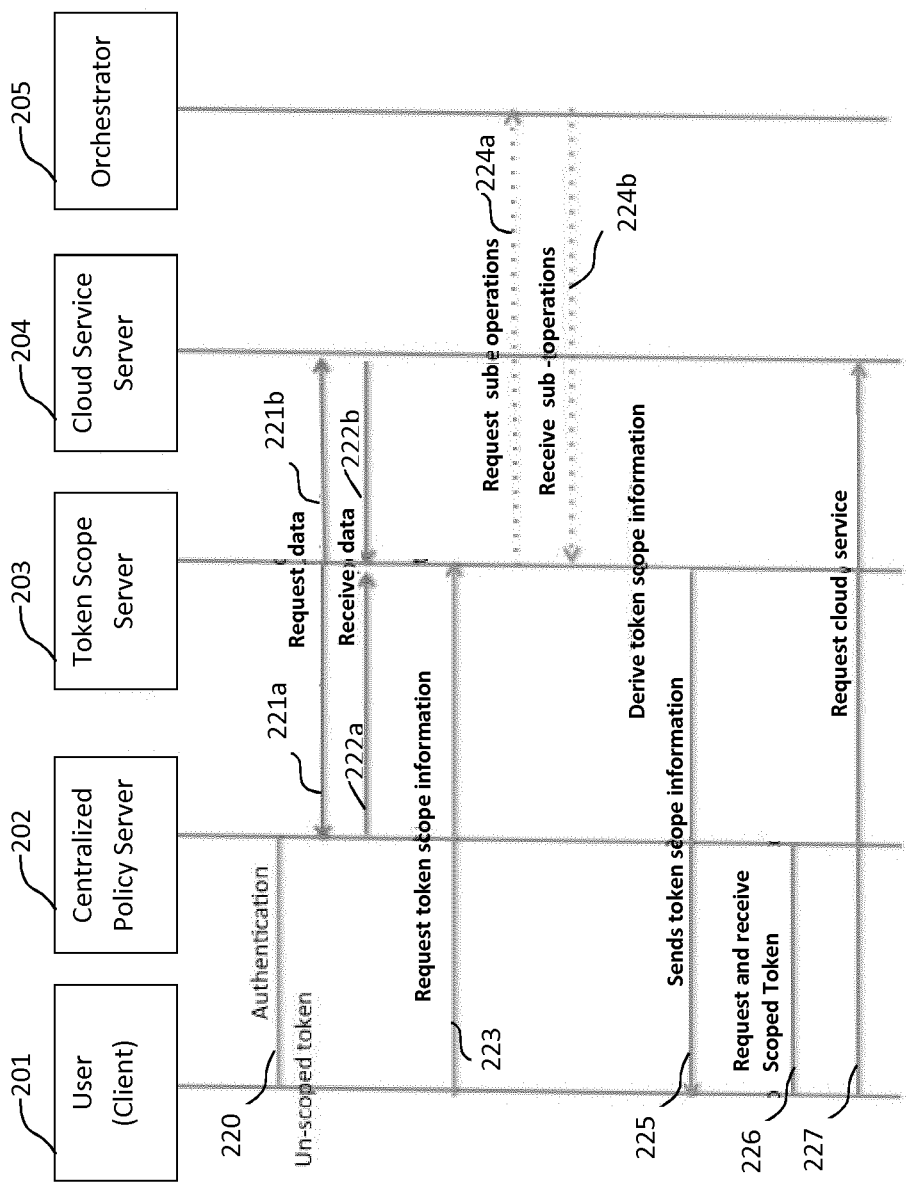
FIG. 2 shows a message flow according to an embodiment of the present invention.

FIG. 2 shows the token scope server 203 requesting data from both the centralized policy server 202 and the cloud service server 204. However, in one embodiment the token scope server 203 requests data from the centralized policy server 202 only, 221a. The centralized policy server 202 comprises data for one or several cloud services and so acts as a central policy collection point. This provides the advantage of easy administration and control over the data. In an alternative embodiment, the token scope server 204 collects data from each cloud service server 204, 221b. In this embodiment, each cloud service server 204 has data comprising policy administration files and policy information for its specific service.

The token scope server 203 then receives data of said cloud service from the centralized policy server 202 and/or the cloud service server 204, (steps 222a, 222b) depending on where from the token scope server 203 requested the data.

In FIG. 2, steps 221a, 221b, 222a and 222b are shown to occur after step 220, however it should be understood that the token scope server 203 is not limited to request and receive data after the user 201 has authenticated with the centralized policy server 202, step 220. The token scope server 203 requesting and receiving data can occur before or after step 220. Furthermore, step 221a, 221b can occur before step 220, and step 222a, 222b can occur after step 220. The data fetching process can be based on mechanisms such as request/response or publish/subscribe.

Next, the token scope server 203 receives from the user 201 a token scope information request for an operation of the cloud service, step 223. The request comprises the unscoped token, which is used as authentication of the user 201 to the token scope server 203. The unscoped token only allows a user which has been authenticated against the centralized policy server 202 to send a token scope information request.

The user 201 and the token scope server 203 may communicate according to the hypertext transfer protocol (HTTP), and so the token scope server 203 may receive the token scope information request as an HTTP request. An example of a token scope information request is HTTP GET message. A further example request format includes;

GET/scoped_data
Host: Token_Scope_Server_URL
HTTP header:
Auth_token: unscoped_token
Ops-type: post
Ops-resource: Server
Ops_service_end_point: example.com This example shows the user 201 requesting token scope information for an operation to create a server on example.com endpoint. The Ops-* request headers defines the user's 201 intended operation for which it wants token scope information.

In some cases, a requested operation is a simple operation, however it may also be a complex operation such as create a server, or create a virtual machine. Such an operation can be considered to be complex as it comprises at least two sub-operations or a set of deterministic granular sequence of operations. These sub-operations could for example comprise; create a server, get an image or attach a network. This information may be prepopulated in an orchestrator 205.

In order to determine and identify if the operation comprises at least two sub-operations (i.e. two granular operations), the token scope server 203 can request the orchestrator 205 for determining if the operation comprises at least two sub-operations and if so identifying the sub-operations, step 224a. A function to request the orchestrator 205 to determine and identify sub-operations in an operation may for example be as follows;

Derive_operations(ComplexOperation, Service_end_point):
[GranularOperation,, Service_end_point)]=From orchestration engine derive (GranularOperation,, Service_end_point) tuples for (ComplexOperation,, Service_end_point) tuple In this example, the GranularOperation is a sub-operation executable in the cloud service server 204.

The orchestrator 205 then determines and identifies the sub-operation, if any. In the case that the operation comprises sub-operations, the token scope server 203 receives a response comprising said sub-operations, step 224b. In the case that the operation does not comprise any sub-operations, the token scope server receives a response comprising the operation only, step 224b, i.e. no other operations or sub-operations. In other words, the orchestrator simply returns the operation it received from the token scope server 203 in step 224a.

An example of derivation can be as follows;
Request:
Derive_operations((Server, POST), example.com):
Response:
[((server, POST), example.com), ((server_image, GET), example.com), ((server_attach_network, POST), example.com), ((server_attach_storage, POST), example.com)]

In the above example, a request is sent by the token Scope server 203 to the orchestrator 205 to derivate a complex operation, for example, creating a server (Server, POST). An example response is also shown above.

The steps 224a, 224b are optional as also indicated in FIG. 2 by the dashed lines representing the request and receive messages.

In the next step, the token scope server 203 derives token scope information based on the data for the desired or requested operation requested by the user 201. The token scope server 203 does so by matching the requested operation with the data so as to derive the token scope information. In the case of a simple operation, not comprising any sub-operations, the simple operation may be defined as (operation, action) tuple and the token scope server 203 matches this tuple against the cloud service's policy administration files and policy information. In the case of several sub-operations, each sub-operation is defined by a (operation, action) tuple, and the token scope server 203 matches each tuple against the cloud service's policy administration files and policy information. Note that, in the (operation, action) tuple the operation field includes the resource for which the operation is going to be performed.

An example of an algorithm for deriving the token scope information will now be described. It should be understood that the (operation, action) tuple is used below as an example and is not limited to the fields operation and action. In other words, it should be appreciated that the tuple may contain more fields, e.g. endpoint, service or domain.

The first function of the algorithm is a Scoped_info function. This is a higher level function and it derives scope info for the requested operation. This function is applicable to both complex operations comprising sub-operations, and simple operations not comprising sub-operations. The first function of the algorithm may be followed by a second function, a Filter_and_combine function. This function removes duplicate token scope information and combines token scope information (scope_info) of sub-operations or granular operations. An example of the Scoped_info function and the Filter_and_combine function may be as follows;

Scoped_info ([(operation, action, service_end_point)])
  For each (operation, action, service_end_point) tuple in [(operation, action, service_end_point)]
   Scope_info=Find Scoping_info (operation, action, service_end_point)
  Filter_and_combine (scope_info)

The algorithm further comprises a Scoping_info function which is an expansion of the Scoped_info function. This function finds token scope information for a particular sub-operation or granular operation against a service_end_point, wherein the service end point is a cloud service. The algorithm identifies the policy administration file and the policy information, which in the below algorithm is expressed as "policy file". An example of the Scoping_info function may be as follows;

Scoping_info (operation, action, service_end_point)
  Check policy_file for the service_end_point in TS-aaS cache
  If policy_file exist
   read policy file
  else
   read policy_file for the service_end_point from policy server
  filter_output=Filter (policy_file, operation, action)
  return filter_output The algorithm further comprises a Filter function which finds the exact token scope information for the desired or requested operation of a cloud service from the policy file (data comprising the policy administration files and the policy information). An example of the Filter function is as follows;

Filter (policy_file, operation, action):
  Step 1: Find conditional_rules from the policy_file using a matching algorithm for the (operation, action) tuple.
  Step 2: From conditional_rules derive rule_scope_info
  Step 3: From rule_scope_info derive minimal_scope.
  Step 4: return minimal_scope In step 1, the Filter function uses a matching algorithm to find related conditional_rules relevant for the (operation, action) tuple from the policy_file. The conditional_rules define the conditions needed to be satisfied to perform the (operation,action). The matching algorithm can be a simple string matching or regular expression matching or a specific algorithm required to read policy files depending on the policy file format.

In step 2, the Filter function uses implementation dependent logic, derive rule_scope_info (i.e. roles, domains, tenant, and/or environmental conditions) required to perform the (operation, action) tuple from matched conditional_rules.

In step 3, the Filter function derives the minimum token scope information (minimal_scope) from rule_scope_info. For example, it may be that a user 201 is allowed to use either of net_admin and net_user role, and the token scope server 203 has identified that the requested (operation, action) can be performed by both roles. In order to establish the minimum token scope information, or rather the preferred role, the token scope server 203 can be configured to do so (automated mode), or alternatively the user 201 can be configured to do so (user assisted mode).

In the embodiment where the token scope server 203 derives the minimum token scope information (automated mode), the data that the token scope server 203 collected in steps 221a, 221b, 222a and 222b, further comprises scope parameters that are hierarchically defined such that the token scope server 203 can identify in the policy information a client's preference for particular scope token information or in this case role.

For example, the scope parameters net_user and net_admin roles may be hierarchically sorted in the data or policy file such that net_user<net_admin. The next step is to find which role from the ascending list is satisfied by the user 201. This requires matching the derived token scope information against the information of the requesting user. For example, if the user has both the net_user and net_admin role, this step returns net_user role as minimum token scope information for the role. Thus, the token scope server 203 sends the minimum token scope information to the user 201. This is represented by the function 'minimal_scope' in step 4.

In the case where the user 201 is configured to derive the minimum token scope information (user assisted mode), the token scope server 203 sends the user 201 at least two sets of token scope information for the same operation, step 225, and the client 201 determines which set of token scope information to send to the centralized policy server 202.

An example of automated and user assisted mode responses will now be given. In the below example it is assumed that the user has owner role and owner role has lowest capabilities among all the roles.

A policy administration file of a service X_end_point is defined in the following way (fetched in step A and B):
 "server:create": "rule:serveradminowner_",
 "server:create: attach_network": "rule:netadmin_owner",
 "serveradminowner": "role: server_admin or role:owner",
 "netadmin owner": "role: net_admin or role:owner",
 Example Scope Response for user-assisted mode:
 Scoped_info ([(server, POST, X_end_point), (server-attach_network, POST, X_end_point)]):
  (server, create, X_end_point)=([(server, POST, X_end_point)
  (server, create: attach_network, X_end_point)= (server_attach_network, POST, X_end_point)

(role: net admin or role:owner, role: server admin or role:owner)=Derive from Scoping_info ((server, create, X_end_point) and Scoping_info((server, create: attach_network, X_end_point)

Filter_and_combine (role: net admin or role:owner, role: server admin or role:owner)

Final Response:
role_id={(role: net_admin or role:owner),(role: server_admin or role:owner)}

Example Scope Response for automated mode:
Scoped_info ([(server, POST, X_end_point), (server_attach_network, POST, X_end_point)]):

(server, create, X_end_point)=([(server, POST, X_end_point)

(server, create: attach_network, X_end_point)=(server_attach_network, POST, X_end_point)

(role:owner, role:owner)=Derived from Scoping_info ((server, create, X_end_point) and scoping_info((server, create:attach_network, X_end_point)

Filter_and_combine (role:owner, role:owner)

Final Response:
role_id={role:owner}

When the token scope server 203 has derived the token scope information as mentioned above, the token scope server 203 sends the token scope information to the client as represented by step 225 in FIG. 2. As discussed above, the token scope information may be returned as a minimum token scope information (automated mode) or it may be returned as at least two sets of token scope information to the user (user assisted mode).

After receiving the token scope information, the user 201 may decide on minimum token scope information (user assisted mode) if required, and then send a scope token request to the centralized policy server 202, step 226. If the client is not to decide minimum token scope information, the client will proceed to send a scope token request as soon as they have received the token scope information, step 226. When the centralized policy server 202 has received the scope token request, the centralized policy server 202 may verify the authenticity of the user 201 by verifying the unscoped token or some other credentials.

The centralized policy server 202 then prepares a scoped token based on the token scope information in the scope token request, and then sends the scoped token to the user 201, step 226.

The user 201 then sends a request to the cloud service server 204, or the service end point, for the desired or requested operation. The request includes the scoped token which is tailored to the particular operation. See step 227 in FIG. 2.

The advantage of the method described above with reference to FIG. 2, is that the user 201 or the client can request a scoped token and the centralized policy server 202 will prepare a scoped token with exact capabilities, i.e. the token is not over scoped (i.e. has too many capabilities and so is a security risk), nor is the token under scoped (i.e. not enough capabilities to enable the client access to the cloud service.)

An embodiment of a method performed by a server, or a token scope server, will now be described with reference to FIG. 3.

In this method, the token scope server requests from another server for data of a cloud service, step 301. The other server may be a centralized policy server 202 or a cloud service server 204 as described with reference to FIG. 2. The data comprises policy administration files or policy information of a cloud service, similar to that described with reference to FIG. 2.

The next step is for the token scope server to receive the data requested from the centralized policy server 202 or the cloud service server 204, step 302.

The token scope server receives a token scope information request from a client for an operation of a cloud service, step 303. The client may be either a user or an orchestrator working on behalf on the user. The operation may be a complex operation comprising sub-operations or it may be a simple operation. Examples of an operation of a cloud service include create a server or create a virtual machine.

Figure 3:
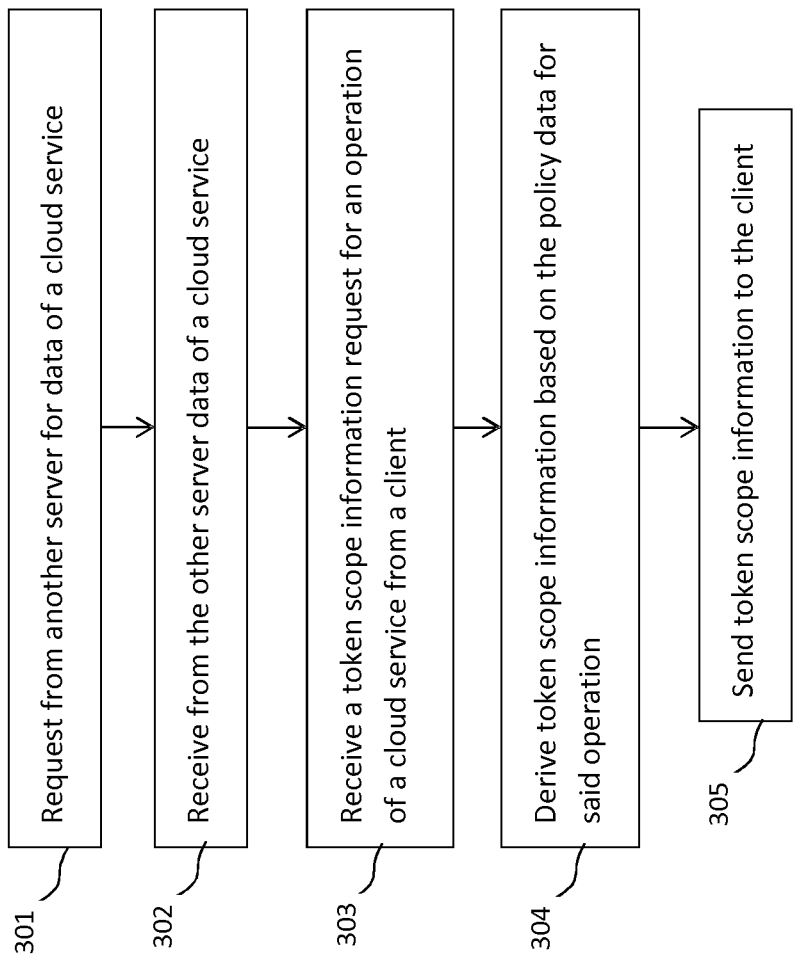
FIG. 3 shows a flow chart illustrating process steps in a method performed by a server.

It should be appreciated that steps 301, 302 and 303 do not have to occur in the order shown in FIG. 3. The token scope server can request and receive data from another server independent of receiving a token scope information request.

After the token scope server has received a token scope information request, the token scope server derives token scope information based on the data for the requested operation, step 304. The token scope server may derive the token scope information according to the method and algorithm described with reference to FIG. 2.

When the token scope server has derived the token scope information, the token scope server sends the token scope information to the client, step 305.

The method of the token scope server enables the client to request a scoped token with the exact capabilities for a particular cloud service. The token scope server provides a service to a client such as a user or an orchestrator working on behalf of the user, providing a client with token scope information.

Various embodiments of the method of the token scope server will now be further described with reference to FIG. 4. Steps 401, 402 and 403 relate to the token scope server collecting data from another server and receiving a token scope information request from a client for an operation of a cloud service. These three steps correspond to steps 301, 302 and 303, described with reference to FIG. 3 and so a detailed description of steps 401, 402 and 403 will therefore be omitted.

Once the token scope server has received a token scope information request for an operation of a cloud service, 403, the token scope server may send a request to an orchestrator for determining if the operation comprises at least two sub-operations, and if so identify the sub-operations, step 404. The orchestrator is working on behalf of the client and should be understood to be a system which is used for coordinating and sequencing the services, processes and threads in the number of applications.

If the orchestrator determines and identifies at least two sub-operations, the token scope server receives a response from the orchestrator comprising the sub-operations, step 405*a*. If the orchestrator determines that the operation does not comprise any sub-operations, the token scope server receives a response from the orchestrator comprising the operation that the token scope server initially sent to the orchestrator, step 405*b*.

The token scope server thereafter derives token scope information based on the data for each sub-operation, step 406*a*, or based on the data of the operation, step 406*b*, depending on if the orchestrator identified any sub-operations.

The token scope server can be configured to derive token scope information by matching each sub-operation with the data so as to derive token scope information for each sub operation, step 407*a*. Alternatively, in the case of only one operation, the token scope server matches the operation with the data so as to derive token scope information for the operation, step 407*b*. The matching of sub-operations and operation with the data comprising policy administration files and policy information is similar to that described with reference to FIG. 2.

There may also be an additional step in the event that the token scope information was derived for several sub-operations. In this step, 408, the token scope server may remove duplicate token scope information and then combine the token scope information of each sub-operation before sending the token scope information to the client.

The next step is to send the token scope information to the client, step 409.

Another embodiment of a method will now be described with reference to FIG. 5. In this embodiment, an orchestrator 505 has a greater functionality than in the orchestrator in embodiments described with reference to FIGS. 2 and 4.

In this method, a user 501 authenticates and requests an unscoped token from a centralized policy server 502, step 520. In return the centralized policy server sends an unscoped token to the user, step 502. Step 520 is similar to step to step 220 and so will not be described in further detail. Similarly, steps 521*a*, 521*b*, 522*a*, 522*b* wherein a token scope server collects data from the centralized policy server 502 or the cloud service server is similar to steps 221*a*, 221*b*, 222*a*, 222*b* described with reference to FIG. 2 and so a detailed description will be omitted.

In the next step, the user sends a token scope information request for an operation of a cloud service to an orchestrator 505, step 523. The request further includes an unscoped token. The token scope information request may be a HTTP GET message.

The orchestrator 505 thereafter sends the token scope server 503 the token scope information request including the unscoped token, step 524.

The token scope server 503 may send a request back to the orchestrator to determine if the operation of the cloud service comprises sub-operations 525*a*. The orchestrator 505 will determine and derive sub-operations and then return the sub-operations to the token scope server, step 525*b*. Steps 525*a* and 525*b* are similar to steps 224*a* and 224*b* described with reference to FIG. 2 and so a detailed description will be omitted.

The next step is for the token scope server 503 to derive the token scope information similar to that described with reference to FIGS. 2, 3 and 4. Thus, again a detailed description is omitted.

Once the token scope server 503 has derived token scope information for an operation of a desired cloud service, the token scope server 503 sends the token scope information to the orchestrator 505, step 526.

In this embodiment, the token scope server 503 determines the minimal token scope if necessary (automated mode). A user assisted mode cannot be used because the user does not receive the token scope information.

Once the orchestrator 505 has received the token scope information, it sends a scoped token request to the centralized policy server 502 together with the unscoped token. In response, the centralized policy server 502 prepares a scoped token based on the token scope information and sends the scoped token to the orchestrator, step 527.

The orchestrator now has a scoped token which it can use with the cloud service, thus the orchestrator 505 sends a request to the cloud service server 504, or the end point service, for the desired or requested operation. The request includes the scoped token which is tailored to the desired or requested operation. See step 528 in FIG. 4. This request may be sent as HTTP GET message.

It should be appreciated that in the above described embodiment, the orchestrator 505 acts on behalf of the user and so the orchestrator 505 can be considered to be the client.

Figure 4:
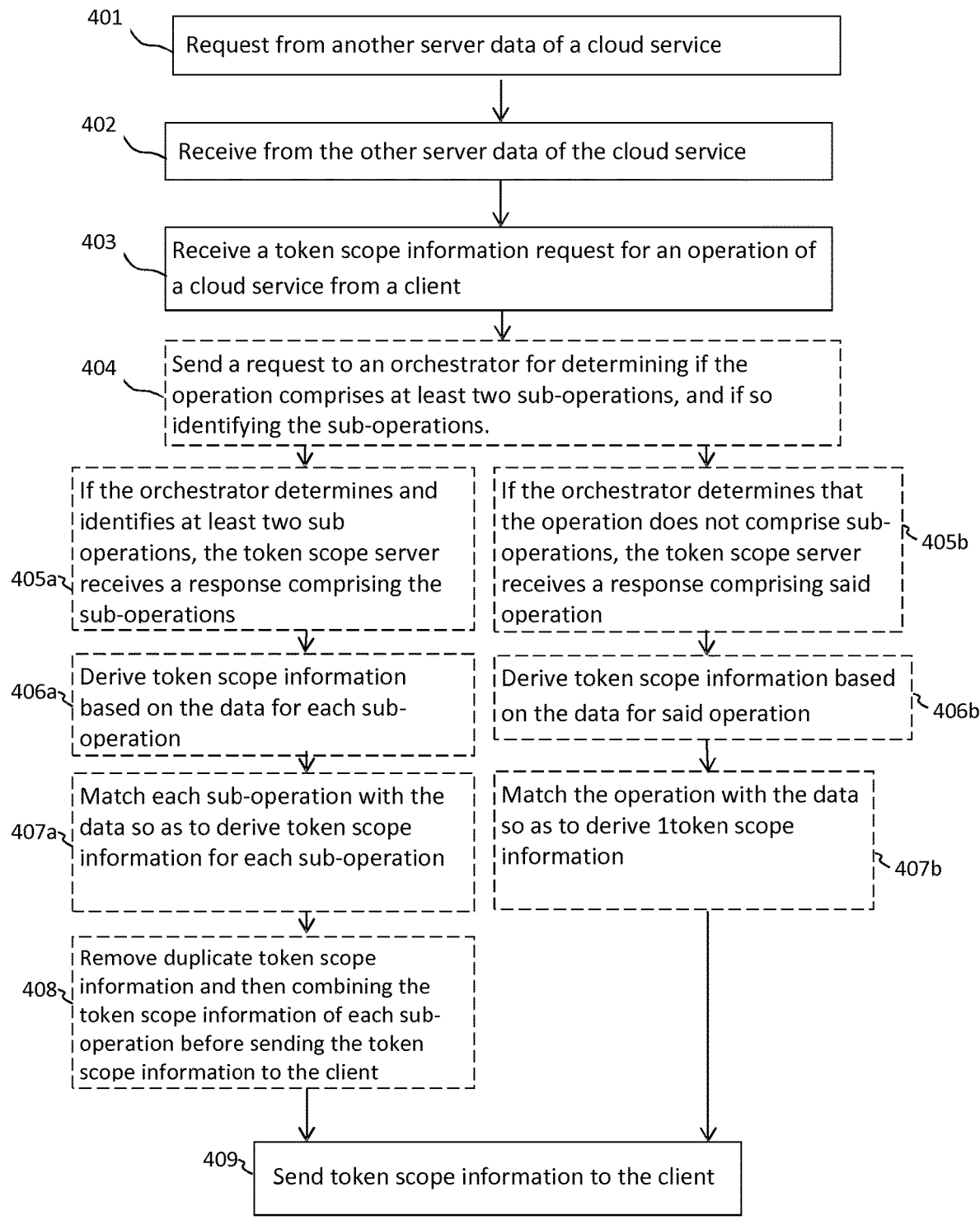
FIG. 4 shows a flow chart illustrating further process steps in a method performed by a server.
Figure 5:
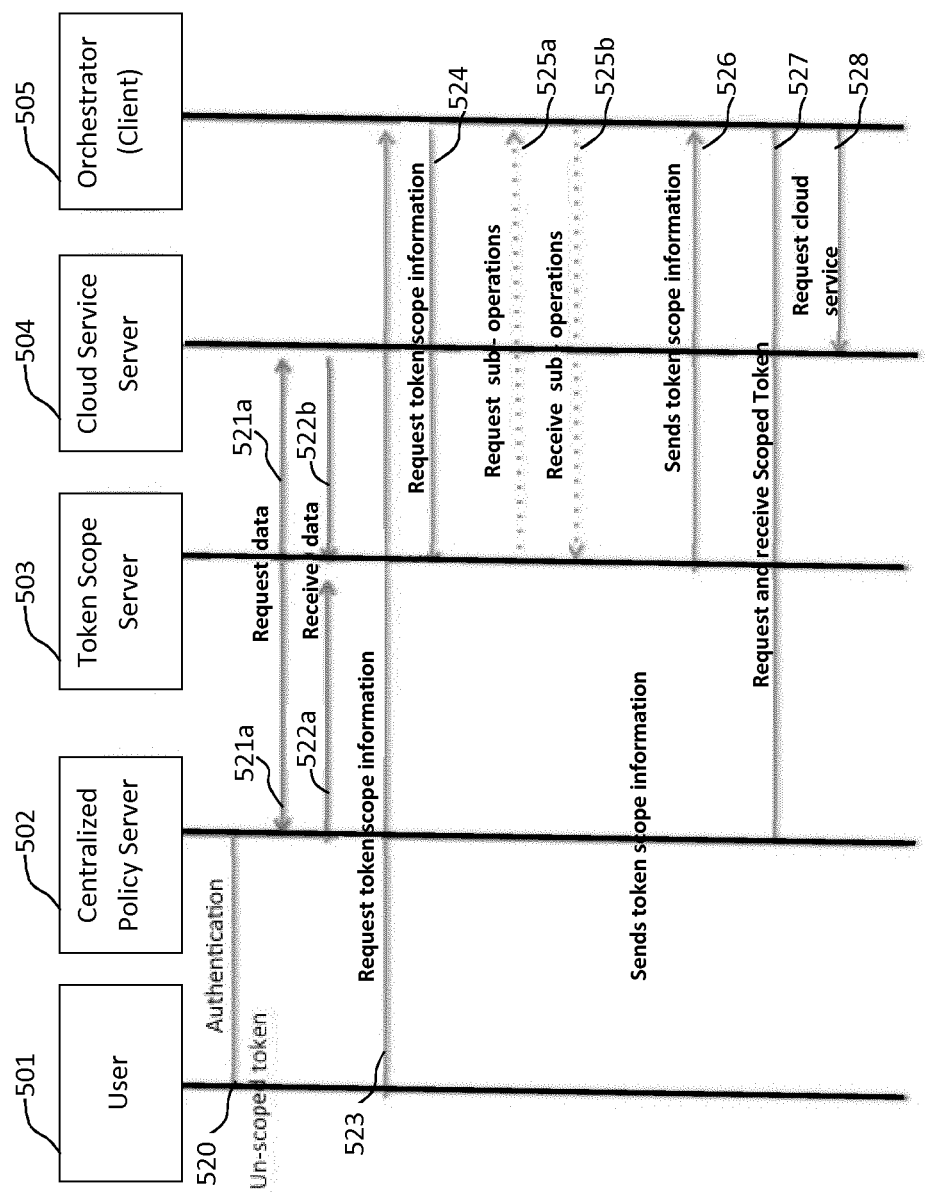
FIG. 5 shows a message flow according to another embodiment of the present invention.

It should also be understood that the method of the token scope server described with reference to FIGS. 3 and 4 are also applicable to the embodiment described with reference to FIG. 5, however the "client" described with reference to FIGS. 3 and 4 shall then be considered to be the orchestrator 505.

The advantages of the embodiments described with reference to FIGS. 2 to 4, are also enjoyed by the embodiments described with reference to FIG. 5.

According to the present invention, there is an embodiment that is similar to the embodiment shown in FIG. 2, however it differs in how the token scope information is sent to the user 601. In this embodiment, the token scope information is sent as a Uniform Resource Identifier, URI, step 625. The URI may be sent as a HTTP message.

The token scope server 603 sends the URI together with a message digest to the user 601, step 625. The message digest is a one-way hash of token scope information contained in the URI.

The user 601 then sends a scoped token request to the centralized policy server 602 comprising the URI and the message digest. The centralized policy server (which also acts as authentication server) 602 returns a scoped token based on the URI and message digest, step 626. The centralized policy server 602 can employ several ways to ensure the limit of the scoped token. For example, it can query the token scope server 603 to find the token scope information for the requested URI. Or, it can trust the signed digest already received from token scope server 603.

The user 601 then sends a request to the cloud service server 604, or the end point service, for the desired or requested operation. The request includes the URI and message digest which is tailored to the desired or requested operation, step 627.

The cloud service server 604 sends a request for the token scope information from the token service server 603 using the URI within the scoped token, step 628.

In return the token scope server sends the token scope information matching or linked with the URI to the cloud service server, step 629. The cloud service server then performs digest matching and if the digest is matched, and the token scope permits the requested operation, the cloud service performs the desired or requested operation.

An embodiment of a method performed by a token scope server will now be described with reference to FIG. 7. In this embodiment, the token scope information is sent as a URI.

Figure 6:
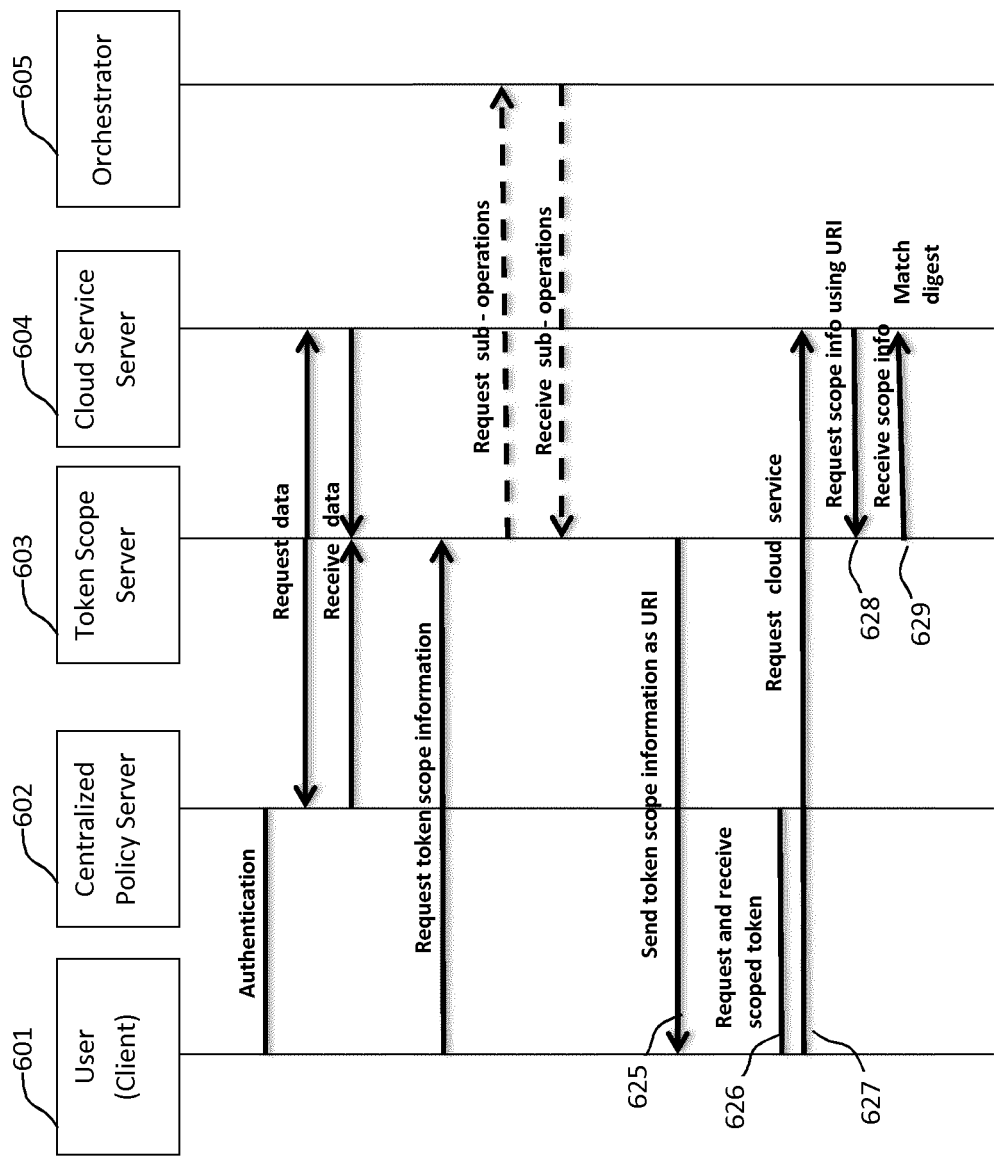
FIG. 6 shows a message flow according to another embodiment of the present invention.

In this method, the token scope server requests from another server for data of a cloud service, step 701. The other server may be a centralized policy server 602 or a cloud service server 604 as described with reference to FIG. 6. The data comprises policy administration files of a cloud service or policy information about user attributes which is described in more detail with reference to FIG. 2.

The next step is for the token scope server to receive the data requested from the centralized policy server 602 or the cloud service server 604, step 702.

The token scope server receives a token scope information request from a client for an operation of a cloud service, step 703. The client may be either a user or an orchestrator working on behalf on the user. The operation may be a complex operation comprising sub-operations or it may be a simple operation. Examples of an operation of a cloud service include create a server or create a virtual machine.

Figure 7:
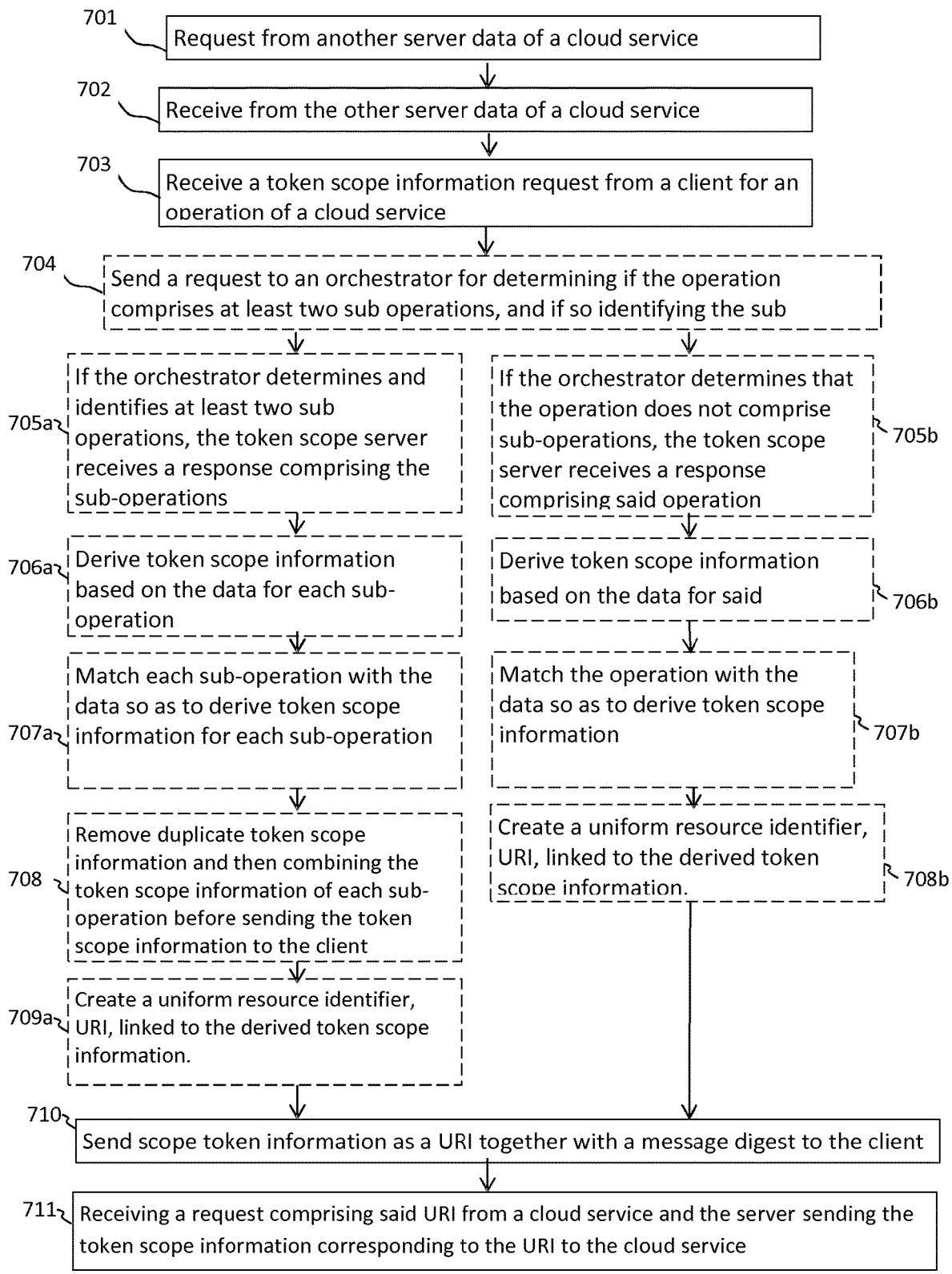
FIG. 7 shows a flow chart illustrating process steps in a method performed by a server.
Figure 8:
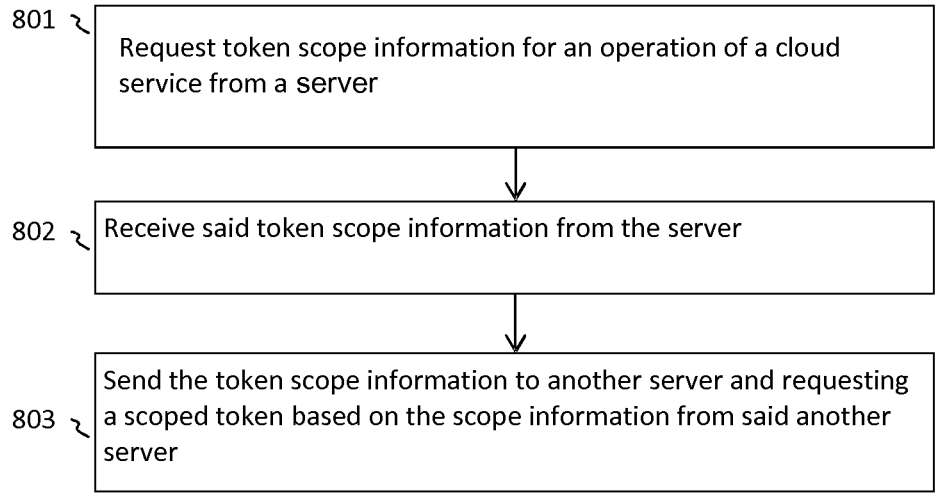
FIG. 8 shows a flow chart illustrating process steps in a method performed by a client.

It should be appreciated that steps 701, 702 and 703 do not have to occur in the order shown in FIG. 7. The token scope server can request and receive data from another server independent of receiving a token scope information request.

Once the token scope server has received a token scope information request for an operation of a cloud service, the token scope server may send a request to an orchestrator for determining if the operation comprises at least two sub-operations, and if so identify the sub-operations, step 704. The orchestrator is working on behalf of the client and should be understood to be a system which is used for coordinating and sequencing the services, processes and threads in the number of applications.

If the orchestrator determines and identifies at least two sub-operations, the token scope server receives a response from the orchestrator comprising the sub-operations, step 705*a*. If the orchestrator determines that the operation does not comprise any sub-operations, the token scope server receives a response from the orchestrator comprising the operation that the token scope server initially sent to the orchestrator, step 705*b*.

The token scope server thereafter derives token scope information based on the data for each sub-operation, step 706*a*, or based on the data of the operation, step 706*b*, depending on if the orchestrator identified any sub-operations.

The token scope server can be configured to derive token scope information by matching each sub-operation with the data so as to derive token scope information for each sub operation, step 707*a*. Alternatively, in the case of only one operation, the token scope server matches the operation with the data so as to derive token scope information for the operation, step 707*b*. The matching of sub-operations and operation with the data comprising policy administration files and policy information can similar to that described with reference to FIG. 2.

There may also be an additional step in the event that the token scope information was derived for several sub-operations. In this step, 708, the token scope server may remove duplicate token scope information and then combine the token scope information of each sub-operation before sending the token scope information to the client.

Thereafter, the token scope server sends the token scope information as a URI together with a message digest to the user, step 710. The message digest is a one-way hash of token scope information contained in the URI.

The token scope server will later on receive a request comprising said URI from a cloud service and the token scope server sends the token scope information corresponding to the URI to the cloud service, step 711.

The method of the token scope server enables the client to request a scoped token with the exact capabilities for a particular cloud service. The token scope server provides a service to a client such as a user or an orchestrator working on behalf of the user, providing a client with token scope information.

The advantage of sending the token scope information as a URI is that the URI makes the scoped token smaller and reduces exposure of sensitive information.

In the embodiments where the token scope information is sent as a URI, the token scope server is configured to determine the minimal token scope information as described above with reference to automated mode.

According to another aspect of the invention, there is provided an embodiment of a method performed by a client for obtaining token scope information so to request a token for a cloud service. The client may be a user or an orchestrator.

The method comprises the client requesting token scope information for an operation of a cloud service from a server, step 801. The client receiving said token scope information from the server, 802. Thereafter, the client sending the token scope information to another server and requesting a scoped token based on the token scope information from the other server, step 803. In this embodiment, the server mentioned in steps 801 and 802 may be a token scope server. The other server mentioned in step 803 may be a centralized policy server as that described with reference to the other figures.

Figure 9:
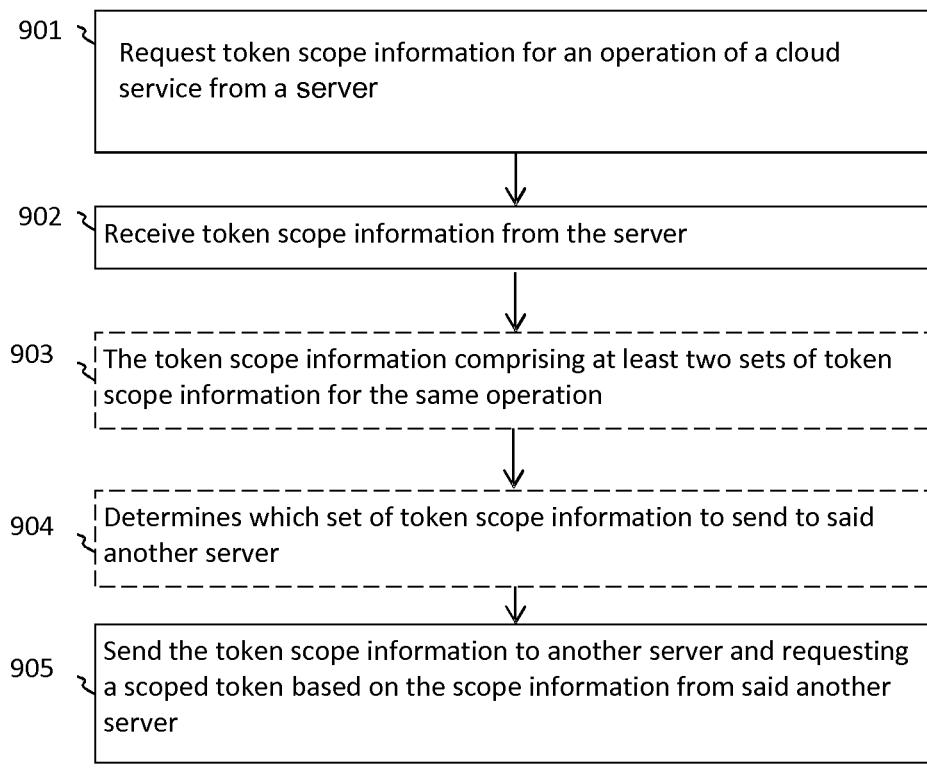
FIG. 9 shows a flow chart illustrating further process steps in a method performed by a client.

Various embodiments will now be further described with reference to FIG. 9. In this embodiment steps 901, 902 and 905 correspond to steps 801, 802 and 803 respectively and so a detailed description of these steps will be omitted.

When the client has received token scope information from the server (token scope server), and the token scope information comprises at least two sets of token scope information for the same operation, the client determines which set of token scope information to send to the other sever (centralized policy server), step 904. Thereafter the client sends the token scope information to the other server and requests a scoped token based on the token scope information from the other server 905.

All the embodiments described above can either be implemented as software and/or hardware.

Figure 10:
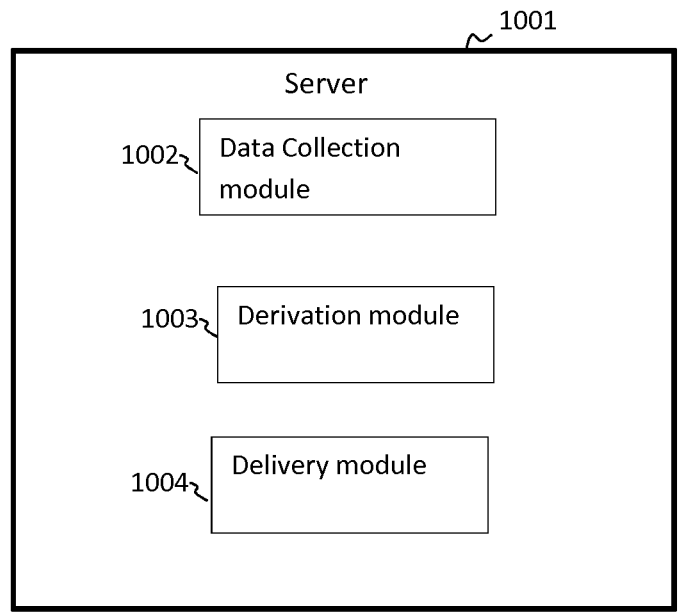
FIG. 10 shows a block diagram illustrating an example of a server.

FIG. 10 illustrates a server 1001 where the method is software implemented. The sever 1001 comprises three modules; a data collection module 1002, a derivation module 1003 and a delivery module 1004. The data collection module 1002 is for collecting data of a cloud service from another server, such as a centralized policy server. The derivation module 1003 for deriving token scope information based on the data for an operation of the cloud service. The delivery module 1004 is for sending token scope information to the client so that the client can request a scoped token with capabilities enabling them to access the operation of the cloud service.

In one embodiment, the derivation module 1003 is further for matching the operation with the data so as to derive the token scope information.

In another embodiment, the derivation module 1003 is further for matching each sub-operation against the data so as to derive token scope information for each sub-operation.

In another embodiment, the delivery module 1004 is further for sending the token scope information to the client as a uniform resource identifier, URI, and upon receiving a request comprising said URI from a cloud service, the server sends the token scope information corresponding to the URI to the cloud service.

Figure 11:
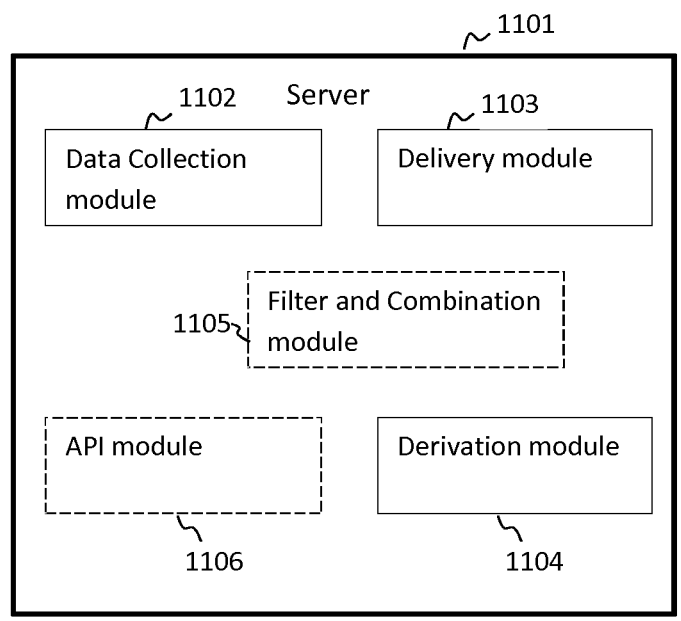
FIG. 11 shows a block diagram illustrating another example of a server.

Alternative embodiments will now be described with reference to FIG. 11. Modules shown in dashed lines are optional. A server 1101 similar to the server 1001 shown in FIG. 10 may in addition comprise a filter and combination module 1105 for removing duplicate token scope information and then combining the token scope information of each sub-operation before sending the token scope information to the client.

The server 1101 may also comprise an application program interface, API, module 1106. The API module is an interface through which the token scope server communicates with other components such as the client or any other server.

In one embodiment, the data collection modules 1002, 1102, the delivery modules 1003, 1103, the derivation modules 1004, 1104, the filter and combination module 1105, and the API module 1106 are implemented with the help of a computer program when run on a processor perform the method described above.

Figure 12:
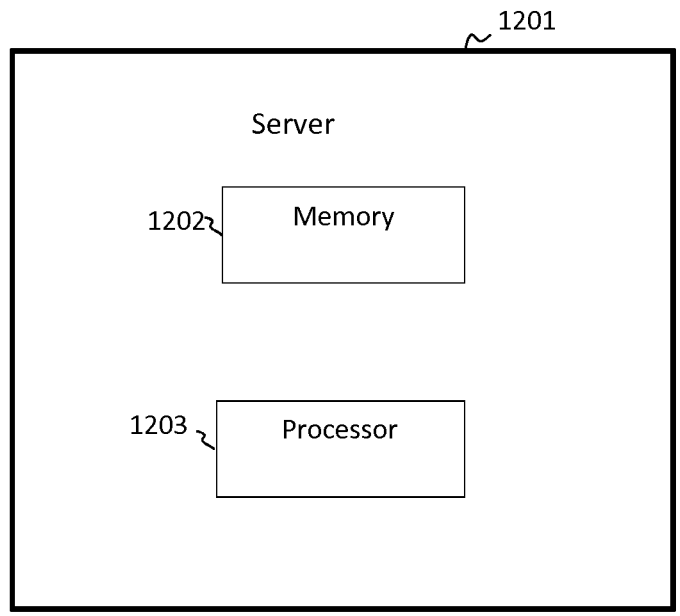
FIG. 12 shows a block diagram illustrating yet another example of a server.

In another embodiment as shown in FIG. 12, a server 1201 configured to determine token scope information so that a client can obtain a scoped token for a cloud service, the server comprising a processor 1203 and a memory 1202, the memory containing instructions executable by the processor, such that the server is operable to request and receive data of a cloud service from another server; receive a token scope information request for an operation of a cloud service from a client; derive token scope information based on the data for said operation, send token scope information to the client so that the client can request a scoped token with capabilities enabling them to access the operation of the cloud service.

Optionally, the memory may further contain instructions executable by the processor such that the server is operable to perform any of the method steps described above with reference to FIGS. 2 to 7.

Furthermore the token scope server described herein may comprise at least one computer program product in the form of a non-volatile memory or volatile memory, e.g. an EEPROM (Electrically Erasable Programmable Read-only Memory), a flash memory, a disk drive or a RAM (Random-access memory). The computer program product comprises a computer program, which may perform any of the methods described above with reference to FIGS. 2 to 7. The computer program product can be a memory such as that shown in FIG. 12, the memory being any combination of read and write memory (RAM) and read only memory (ROM). The memory also comprises persistent storage, which, for example, can be any single one or combination of magnetic memory, optical memory, solid state memory or even remotely mounted memory."

Figure 13:
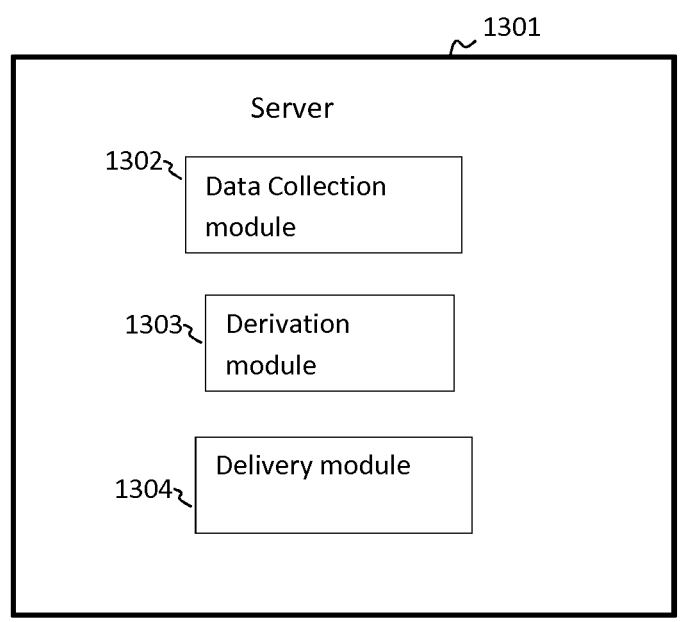
FIG. 13 shows a block diagram illustrating a further example of a server.
Figure 14:
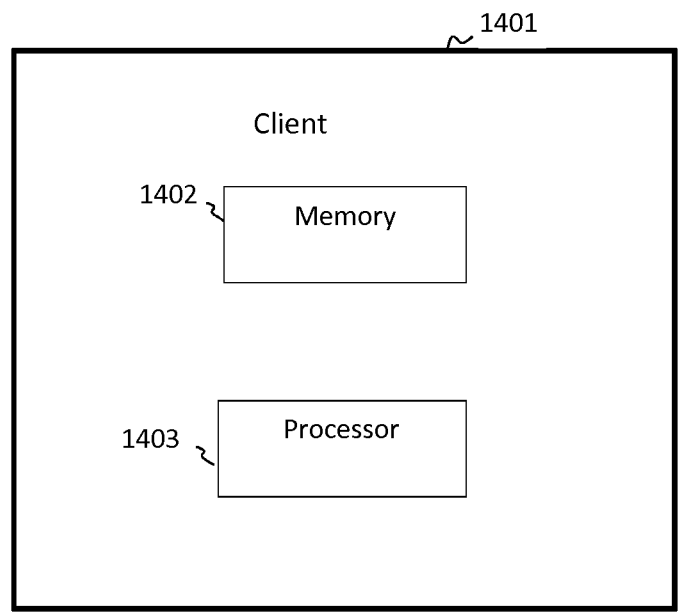
FIG. 14 shows a block diagram illustrating an example of a client.

Another embodiment of a server 1301 will be described with reference to FIG. 13 wherein a server comprises data collection module 1302, and a derivation module 1303 and a delivery module 1304. The data collection module 1302, the derivation module 1303 and the delivery module 1304 are hardware implemented. The data collection module 1302 is configured to collect data of a cloud service from another server, such as a centralized policy server. The derivation module 1303 is configured to derive token scope information based on the data for an operation of the cloud service. The delivery module 1304 is configured to send token scope information to the client so that the client can request a scoped token with capabilities enabling them to access the operation of the cloud service.

It should be understood that the method described above in connection with the client can either be hardware or software implemented or a combination thereof.

An embodiment of the client, such as a device, will now be described, the client comprising a processor 1403 and a memory 1402, the memory containing instructions executable by the processor, such that the client is operable to request token scope information for an operation of a cloud service from a server, receive said token scope information from the server; and send the token scope information to another server and requesting a scoped token based on the scope information from said another server.

Figure 15:
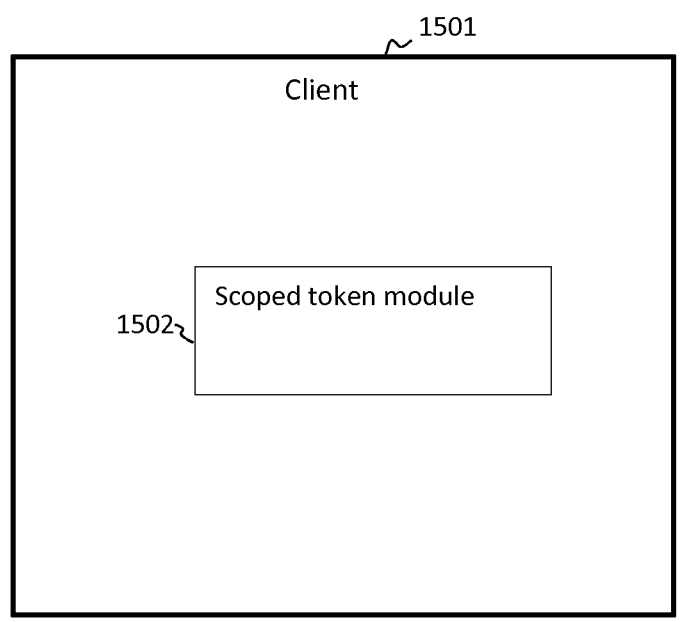
FIG. 15 shows a block diagram illustrating another example of a client.

In another embodiment, the method described herein in connection with the client is software implemented. A client is shown in FIG. 15 comprising a scoped token module. The scoped token module 1502 is for requesting token scope information for an operation of a cloud service from a server; receiving said token scope information from the server; and sending the token scope information to another server and requesting a scoped token based on the scope information from said another server.

In one embodiment, the scoped token module is implemented with the help of a computer program when run on a processor perform the method to request token scope information for an operation of a cloud service from a server, receive said token scope information from the server; and send the token scope information to another server and requesting a scoped token based on the scope information from said another server.

It should also be realized that any reference to a processor herein should be understood to comprise any combination of one or more of a suitable central processing unit (CPU), multiprocessor, microcontroller, digital signal processor (DSP), application specific integrated circuit (ASIC) etc., capable of executing software instructions contained in a computer program stored in a computer program product as described above.

It should be understood that the centralized policy server described herein can be an identity service provider (IdP) or any other suitable server that can communicate with the user, orchestrator and token scope server as described herein.

It should also be realised that in the methods described herein, the user or orchestrator is not limited to sending a scope token request to the centralized policy server. The user or orchestrator can send the scope token request to any token scope provider.

It should also be understood that the token scope server described herein can be implemented as an independent server or it can be combined with an existing cloud service server.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be understood that the different modules and units described herein may communicate according to the hypertext transfer protocol (HTTP), however the embodiments of the present invention are not limited to this protocol.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for providing a cloud service, the method comprising:
   a first server sending toward a second server a request for data related to the cloud service;
   the first server receiving the requested data;
   the first server receiving a request for token scope information for a desired operation of the cloud service, wherein the request for the token scope information was transmitted by a client;
   after receiving the request for the token scope information, the first server deriving the token scope information based on the received requested data and the desired operation of the cloud service; and
   the first server sending the derived token scope information toward the client, wherein the derived token scope information enables the client to generate a request for a scoped token.

2. The method of claim 1, wherein the derived token scope information is limited to the operation of the cloud service.

3. The method of claim 1, further comprising the server matching the operation with the data so as to derive the token scope information.

4. The method of claim 1, further comprising the server sending a request to an orchestrator for determining if the operation comprises at least two sub-operations and if so identifying the sub-operations.

5. The method of claim 4, further comprising the server receiving a response from the orchestrator, the response comprising sub-operations of the operation.

6. The method of claim 4, further comprising the server receiving a response from the orchestrator, the response comprising the operation.

7. The method of claim 5, further comprising the server deriving token scope information for each sub-operation.

8. The method of claim 7, further comprising the server matching each sub-operation against the data so as to derive token scope information for each sub-operation.

9. A first server for providing a cloud service, the first server comprising:
   a processor; and
   a memory coupled to the processor, the memory containing instructions executable by the processor, wherein the first server is configured to:
   send toward a second server a request for data related to the cloud service;
   receive the requested data;
   receive a request for token scope information for a desired operation of the cloud service, wherein the request for the token scope information was transmitted by a client;
   after receiving the request for the token scope information, derive the token scope information based on the received requested data and the desired operation of the cloud service; and
   send the derived token scope information toward the client, wherein the derived token scope information enables the client to generate a request for a scoped token.

10. A computer program product comprising a non-transitory computer readable medium storing a computer program configured, when run on a computer, to carry out a method for providing a cloud service, the method comprising:
   a first server sending toward a second server a request for data related to the cloud service;
   the first server receiving the requested data;
   the first server receiving a request for token scope information for a desired operation of the cloud service, wherein the request for the token scope information was transmitted by a client;
   after receiving the request for the token scope information, the first server deriving the token scope information based on the received requested data and the desired operation of the cloud service; and
   the first server sending the derived token scope information toward the client, wherein the derived token scope information enables the client to generate a request for a scoped token.

11. The server of claim 9, wherein the server is configured to derive the token scope information by matching the operation with the data.

12. The server of claim 9, wherein
   the operation comprises sub-operations, and
   the server is configured to derive the token scope information by matching each sub-operation against the data so as to derive token scope information for each sub-operation.

13. The server of claim 12, wherein the server is further configured to remove duplicate token scope information and combine the token scope information of each sub-operation before sending the token scope information to the client.

14. The server of claim 9, wherein the data comprises policy administration files and policy information.

15. The server of claim 14, wherein
   the data comprises scope parameters that are hierarchically defined, and
   the server is further configured to identify in the policy information a client's preference for particular scope token information.

16. The server of claim 9, wherein
   the server is further configured to send the token scope information to the client as a uniform resource identifier (UR), and
   the server is further configured such that, in response to receiving a request comprising said URI from a cloud service, the server sends the token scope information corresponding to the URI to the cloud service.

17. The method of claim 1, further comprising:
   receiving the request for the scoped token, wherein the request for the scoped token was transmitted by the client and the request for the scoped token comprises at least a subset of the derived token scope information; and
   in response to the request for the scoped token, preparing the scoped token based on the derived token scope information included in the request for the scoped token and transmitting toward the client the requested scoped token.

18. The method of claim 1, further comprising:
   receiving a request for the cloud service, wherein the request for the cloud service was transmitted by the client and the request for the cloud service comprises the scoped token.

* * * * *